April 21, 1936.  K. A. WEBER  2,038,150
GLASS EDGING MACHINE
Filed Jan. 27, 1934   3 Sheets-Sheet 1

Inventor
Karl A. Weber
By Lyon & Lyon
Attorneys

April 21, 1936.    K. A. WEBER    2,038,150
GLASS EDGING MACHINE
Filed Jan. 27, 1934    3 Sheets-Sheet 2

Inventor
Karl A. Weber
By Lyon & Lyon
Attorneys

Patented Apr. 21, 1936

2,038,150

UNITED STATES PATENT OFFICE 2,038,150

GLASS EDGING MACHINE

Karl A. Weber, Los Angeles, Calif.

Application January 27, 1934, Serial No. 708,629

6 Claims. (Cl. 51—76)

This invention relates to glass edging machines, and more particularly to a machine adapted for the automatic edging of plates of glass, particularly plates of laminated glass. As used throughout this specification, the term "glass" is used to include glass, laminated glass formed of plates of glass between which there is positioned a substance such as pyralin, marble, ceramic plates and the like.

It is an object of this invention to provide a machine for treating the successive edges of a plate of glass as the same is supported and carried forward through the machine by a conveyor.

Another object of this invention is to provide a machine for treating the edges of a plate of glass as the same is carried by a conveyor through a machine including a plurality of edge treating units, and which machine includes a means for rotating the glass plate, carrier means of the conveyor to successively position the edges of the plate of glass in the successive units for treatment.

Another object of this invention is to provide a machine for treating the edges of a plate of glass, which machine includes treating elements having grooved peripheries and in which machine there is provided a means for dressing the treating elements for the grooves therein during their operation.

Another object of this invention is to provide a machine for treating the edges of glass, and particularly laminated glass, in which machine there is provided a means for removing the accumulations of pyralin from the treating elements, including a liquid in which the pyralin forming the lamination of the glass is soluble, and a scraping means for removing the liquid and portions of pyralin as they are released from the wheel by the said liquid.

Other objects and advantages of this invention it is believed will be apparent from the following detailed description of a preferred embodiment thereof as illustrated in the accompanying drawings.

Figure 1:
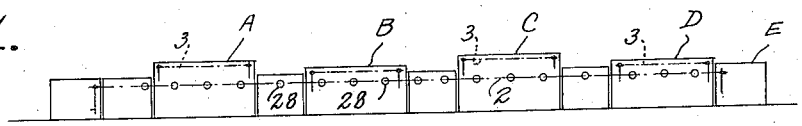
Figure 1 is a diagrammatic elevation of a glass edging machine embodying my invention.
Figure 2:
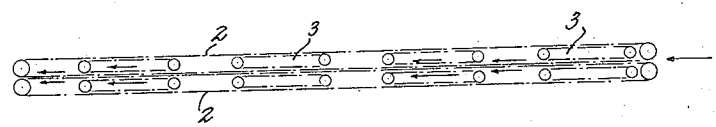
Figure 2 is a diagrammatic top plan view.
Figure 3:
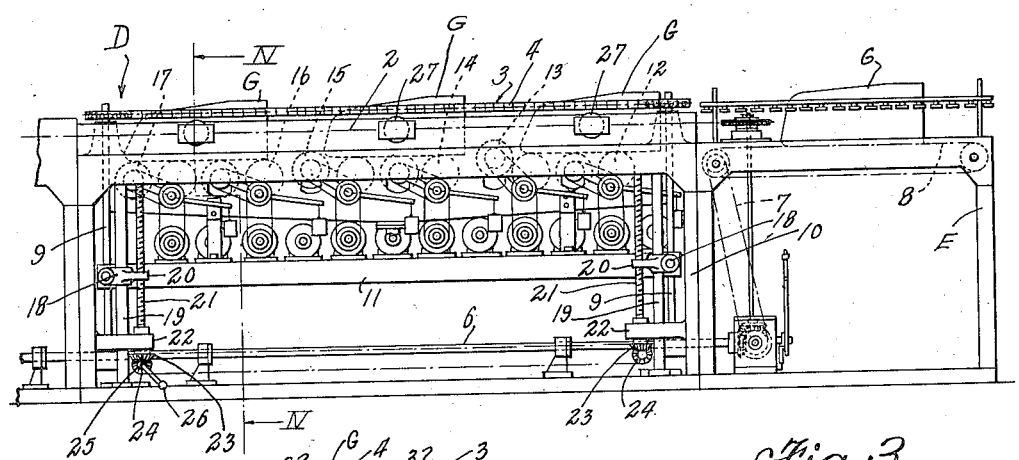
Figure 3 is a side elevation illustrating one of th edge treating units embodying my invention.

In the preferred embodiment of my invention as illustrated in the accompanying drawings, there is illustrated a glass edging machine including a plurality of edging units A, B, C, and D, through which a plate or plates of glass are conveyed by means of continuously operating conveyors 2 which are formed to grip the plate or plates of glass and to continuously convey the plates of glass through the entire machine composed of the units A, B, C, and D, and which conveying means includes a means for gripping the plates of glass which are so formed as to be rotatable to rotate a plate of glass between the units A, B, C, and D to successively present the edges of the plates of glass to the treating units while the plate or plates of glass are held by the single conveying means.

In order that the plates of glass will be steadied, particularly where large plates of glass are having their edges treated, there may be positioned above each unit a steadying conveyor 3 which engages the plates of glass near their upper edges between gripping members 4 carried by the conveyor 3 so as to hold the upper edge of the glass steadied while the lower edges thereof are being treated.

There is likewise provided a feeding unit E, including a separate conveyor 8 by which the operator may feed the plates of glass into the edging machine composed of the plurality of edging units in such timed relation as the operator in his judgment may deem advisable. A line shaft 6 is provided, which is driven from any suitable or desirable source of power and drives through the driving connections 7, the edge supporting conveyor 8 of the feeding unit E, and through driving connections 9, supporting conveyors 3, and through any suitable or desirable form of driving connection the main endless conveyors 2.

Each of the edging units, for example, the edging unit D, includes a frame 10 in which there is supported an edging element frame 11 upon which the edging elements 12, 13, 14, 15, 16, and 17, are supported. The manner of connection and drive of the edging elements 12, 13, 14, 15, 16, and 17 forms no part of the present invention and may be constructed as particularly pointed out and described in my copending application, Serial No. 659,638, filed March 6, 1933, now United States Letters Patent No. 1,958,526, dated May 15, 1934.

In order that the edging elements may be positioned correctly with reference to the conveyor 2 in each of the edging units to operate upon the successively presented edges of the plates of glass as the plates of glass are conveyed through the edging machine by the single or common conveyor, I prefer to mount the edging element frames 11 of each of the units in such a manner that their vertical position may be adjusted relative to the conveyor 2 to thereby properly position the edging elements in position to act upon the edge of the glass as it is presented to each unit.

In order to accomplish this result, I prefer to mount the edging element frame 11 upon slides 18, which slides 18 are mounted to slide vertically upon vertically positioned guides 19. Each of the slides 18 carries a nut 20 through which a vertically disposed screw 21 is threaded. The screws 21 are journaled in bearings 22 supported by the frame 10. Secured to the lower end of the screws 21 are pinions 23 which mesh with pinions 24 secured to a transversely positioned adjusting shaft 25. The adjusting shaft 25 extends to the forward portion of the frame 10 and is there provided with an operating handle 26 by means of which the vertical position of the element frames 11 may be adjusted.

The plates of glass G to be treated by the edging machine are mounted upon the feeding conveyor 8 between the supporting conveyors 3 and are by the feeding conveyor 8 fed forwardly to where they are gripped between the conveyors 2 which convey the plate G through the entire edging unit.

Secured to the conveyors 2 are gripping members 27 provided with resilient gripping pads 28 formed of rubber or other similar yieldable material. The plate of glass G as it is moved forwardly by the conveyor 8 has its end thrust between the conveyors 2 to a position where the oppositely disposed gripping members 27 of the two conveyors 2 grip the opposite faces of the plate G. The plate of glass is then conveyed through the edging unit and has its lowermost edge ground and finished by the respective edging units.

In order to present succeeding edges of the plate of glass G to the respective succeeding edging units, the gripping members 27 are rotatably mounted upon the conveyors 2 so that as the conveyors 2 pass each of the edging units, the gripping members 27 may be actuated to rotate the plate of glass G so as to present a succeeding edge to the next unit. In order to accomplish this operation, each of the gripping elements 27 is journaled on a bearing 29 supported by a pin 30 threaded into the connecting elements 31 of the conveyors 2. The gripping elements 27 are spaced apart along the length of the conveyor 2 so that only one part of the gripping elements grips the surface of the plate of glass.

Secured to the gripping elements 27 are gear wheels 32 provided with teeth 33, the number of which teeth is determined by the position to which it is desired to rotate the plate of glass G to present the succeeding edges thereof to the edging units. Not only may the number of teeth 33 of the gear wheels 32 be varied to determine the amount of rotation of the gripping elements 27, but likewise the position of these teeth may also be varied. For example, in obliquely cut pieces of glass where the respective edges are not at right angles to each other, there will be required a different degree of rotation of the gripping units 27 between the edging units in order to correctly position the succeeding edges of the plates of glass. Thus by varying the position or number of the teeth 33, the amount of rotation of the gripping elements 27 and hence the plate of glass G may be varied.

In order to hold the plate of glass G from rotation while its edge is being treated in each of the edging units there is provided on the conveyors 2 adjacent the gripping members 27 a lock member 34 which is adapted to be engaged between the teeth 33 of the gear wheel 32. The lock member 34 is journaled on a pin 35 carried by the connecting elements of the conveyor 2 and is normally yieldably urged by means of springs 36 into position between the pairs of teeth 33 of the gear wheel 32 to hold the gripping elements 27 from rotation.

Figure 6:
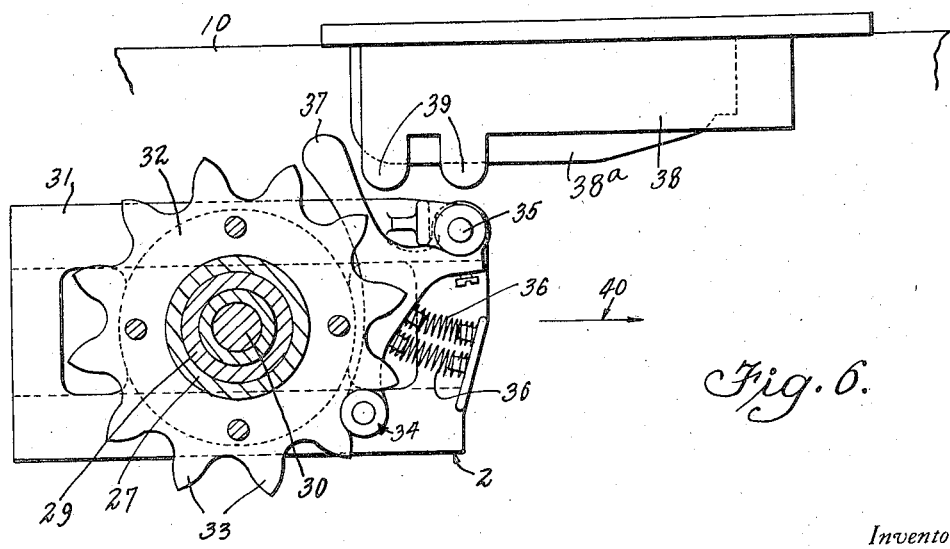
Figure 6 is a fragmental view taken substantially on the line 6—6 of Figure 5 illustrating the operation of one of the plate gripping and turning means embodied in my invention.
Figure 7:
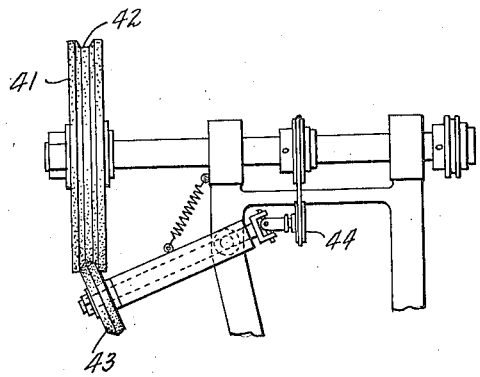
Figure 7 is a diagrammatic view illustrating the edging wheel groove dressing means embodied in my invention.
Figure 8:
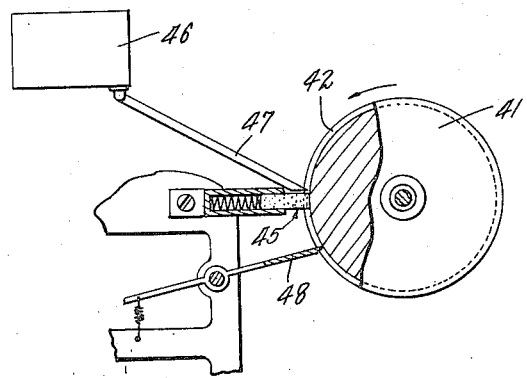
Figure 8 is a diagrammatic view illustrating the means provided in my invention for cleaning the edging wheels of pyralin or other laminating material used in the formation of laminated plates of glass.

An arm 37 which extends outwardly from the lock member 34 is formed integrally with the member 34 and extends into position to be engaged by the actuating cam member 38ᵃ which is secured to the frame of the edging machine intermediate the succeeding edging units. The actuating cam member 38ᵃ engages the arm 37 to release the lock member 34. As the conveyor then proceeds forwardly in the direction indicated by the arrow 40 in Figure 6, the teeth 33 pass between the teeth 39 of the actuating member 38 and cause the gripping elements 27 to be rotated to rotate the plate of glass G. In determining the degree or amount of rotation of the plate of glass G, the number and position of the teeth 39 may likewise be varied in order to correctly position the edge of the plate of glass with relation to the succeeding edging unit.

Figure 4:
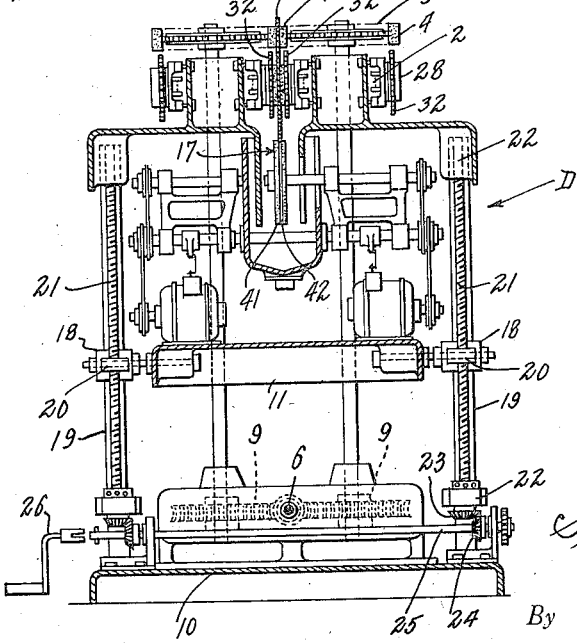
Figure 4 is a sectional view taken substantially on the line 4—4 of Figure 3.
Figure 5:
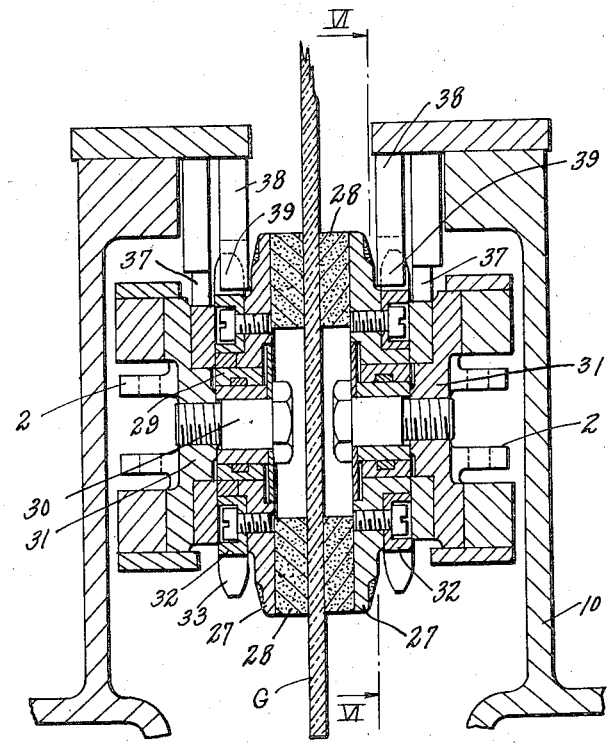
Figure 5 is an enlarged fragmental end view principally in vertical section of the conveyor and glass plate gripping and turning means embodied in my invention.

In order to properly treat the edges of the plates of glass so as to round the edges thereof and to properly grind the edges, I prefer to form each of the edging elements as a grinding wheel, as indicated at 41 in Figure 4. The grinding or finishing wheels of the edging units, including such grinding wheels, have formed in their periphery a groove 42 into which the edge of the plate of glass G is fitted and passes during the treating operation.

I prefer to mount in each unit adjacent each of said grinding wheels 41 an obliquely mounted dressing wheel 43 which fits within the groove of the grinding wheel to dress at all times the groove 42. The dressing wheel 43 is mounted preferably at an angle both vertically and horizontally to the plane of the groove 42. The dressing wheel 43 is driven from any suitable or desirable source such, for example, as by means of driving means illustrated at 44.

In order, particularly when the edging machine embodying my invention is being utilized for the purpose of treating laminated glass, to maintain the surface of the edging units free from the pyralin or other material used to form the lamination, I prefer to mount adjacent each of such treating elements a means as indicated at 45 for continuously supplying to the surface of the edging units kerosene or other material in which the pyralin or laminated material is soluble. The means, as indicated at 45, is preferably in the nature of a portion of felt or other material which will hold and supply continuously the kerosene or other material to the grinding periphery of the treating elements. The piece of felt or other material thus utilized may be continuously supplied with kerosene from a container as indicated at 46 through a drip connection 47.

The kerosene as thus provided to the periphery of the edging units loosens the pyralin as it is ground away from the plate of glass but does not remove the loosened pyralin from the surface of the edging units.

In order to properly keep the operating surfaces of the edging units clean of such pyralin, I prefer to mount adjacent the edging elements a scraper bar 48 which may be formed of steel or other similar material to scrape the loosened pyralin and accumulated kerosene from the surface of the wheel.

Figure 9:
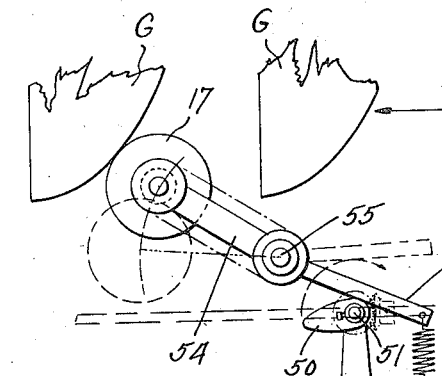
Figure 9 is a diagrammatic illustration of means embodied in my invention for actuating the edge treating elements to position the same relative to advancing plates of glass.

In order to position the edging elements 12, 13, 14, 15, 16 or 17, for example the element 17, in position relative to the advancing plates of glass G, as one plate G passes off the element 17 and a second plate G is moved into position to be edge-treated by the element 17 so that the element 17 does not fracture the advancing corner of the second said plate G, I prefer to employ a timed cam mechanism to move the element 17 downwardly, as illustrated in Figure 9, to where the element 17 will just engage in proper relation the edge of the plate of glass.

This means preferably includes a cam 50 which is rotated with a shaft 51. The shaft 51 is driven from a countershaft 52 in turn driven from a vertical shaft 53 which carries a splined pinion 53ª, permitting vertical movement of the cam drive means when the position of the engaging element requires vertical adjustment. The element 17 is mounted on one end of an arm 54. The arm 54 is pivoted at 55 and the free end of the arm 54ª is provided with means such as the weight 56 to normally urge the element 17 yieldably into treating position.

The cam 50 engages the arm 54ª and the drive of the cam 50 is timed with relation to the drive of the conveyor carrying the plate of glass G so that as one plate G passes off one element 17, the element 17 is moved downwardly to a position just below the edge of the next plate G until the said next plate G is just over the element 17, when the receding action of the cam permits the element 17 to act on said edge.

Having fully described my invention, it is to be understood that I do not wish to be limited to the details herein set forth, but my invention is of the full scope of the appended claims.

I claim:

1. In a glass edging machine, the combination of a plurality of edging units, a conveyor common to said units, a carrier means carried by said conveyor for supporting a plate of glass and carrying the same through the units to be successively treated on successive edges by said units, and means operatively engaging the carrier means to automatically turn the plate of glass to present successive edges of the plate of glass to the successive units.

2. In a glass edging machine, the combination of a plurality of edging units, a conveyor common to said units, carrier means carried by said conveyor for supporting a plate of glass and carrying the same through said treating units, a spaced supporting conveyor for each of said units spaced from the common conveyor to support the plate of glass while being treated by said unit, and turning means adapted to engage the carrier means to turn the plate of glass to automatically present successive edges of glass plate to treatment in said units.

3. In a glass edging machine, the combination of a plurality of units, a common conveyor adapted to convey a plate of glass through said units, edge treating means in each of said units, means for supporting the edge treating means in each of said units, means for adjusting said treating means to adjust the position of edge contact of said edge treating means separately for each unit, carrier means carried by the conveyor for supporting and carrying the plate of glass through said units, and means adapted to operatively engage the carrier means to turn the plate of glass to successively present the edges of said plates of glass to said units for edge treatment.

4. In an edging machine for plates of laminated glass, the combination of an edging wheel, means for conveying a plate of laminated glass by the edging wheel, means for applying a liquid to the surface of the edging wheel in which liquid the pyralin of the laminated glass is soluble, and a scraper member mounted to remove the pyralin and liquid from the surface of the edging wheel.

5. In a glass edging machine, the combination of a series of edging units adapted for treating successively the edges of a plate of glass, a conveyor, means supported by the conveyor for gripping the plate of glass and holding the first edge of the plate of glass in position to be acted on by the first of said edging units, engaging means supported in advance of the second edging unit, and turning means carried by the conveyor adapted to engage the engaging means, and to release the means holding the first edge in treating position and to rotate the turning means to position a second edge of the plate of glass in position to be acted on by the second said edging unit.

6. In a glass edging machine, the combination of a series of edging units, each of said units including a plurality of edge-treating elements and means for positioning said elements, a conveyor common to said units, means carried by the conveyor for gripping a plate of glass, means for turning the plate of glass as it passes between the said units, said means being carried by the conveyor and operable to present successive edges to the treating units, and means for adjusting the position of the treating elements relative to the position of the edges of the plate of glass as the plate of glass is conveyed and turned in passing through the edging units and carried by said conveyor.

KARL A. WEBER.